United States Patent [19]

Sun et al.

[11] Patent Number: 4,978,492
[45] Date of Patent: Dec. 18, 1990

[54] METHOD TO EXTRACT MATERIAL FROM A RUNNING LENGTH OF FIBER

[75] Inventors: Jim C. Sun, Midlothian; Mark B. Boone, Richmond; James J. Dunbar, Mechanicsville; Gene C. Weedon, Richmond, all of Va.

[73] Assignee: Allied-Signal Inc., Morristownship, N.J.

[21] Appl. No.: 237,483

[22] Filed: Aug. 29, 1988

Related U.S. Application Data

[62] Division of Ser. No. 835,020, Feb. 28, 1986, Pat. No. 4,771,616.

[51] Int. Cl.$^5$ .............................................. D01F 11/00
[52] U.S. Cl. .................................. 264/180; 264/184; 264/203; 264/211.16
[58] Field of Search ................ 68/DIG. 1; 264/203, 264/211.16, 211.19, 233, 344, 180, 184; 8/151.2

[56] References Cited

U.S. PATENT DOCUMENTS

| | | | |
|---|---|---|---|
| 2,304,474 | 12/1942 | Poese | 68/DIG. 1 |
| 2,468,081 | 4/1949 | Koster | 68/DIG. 1 |
| 2,509,279 | 5/1950 | Lisson | 264/340 |
| 2,725,276 | 11/1955 | Griset, Jr. | 8/151.2 |
| 3,124,631 | 3/1964 | Davis et al. | 264/203 |
| 3,725,523 | 4/1973 | Bowen | 264/233 |
| 3,918,111 | 11/1975 | Dunn | 68/DIG. 1 |
| 4,248,066 | 2/1981 | Muller | 68/DIG. 1 |
| 4,365,424 | 12/1982 | Hoersch | 68/DIG. 1 |
| 4,413,110 | 11/1983 | Kavesh et al. | 264/164 |

FOREIGN PATENT DOCUMENTS

| | | | |
|---|---|---|---|
| 1290670 | 3/1962 | France | 264/203 |
| 0356323 | 1/1913 | U.S.S.R. | 68/ |

Primary Examiner—Hubert C. Lorin
Attorney, Agent, or Firm—Richard A. Anderson

[57] ABSTRACT

A method of extracting a material from a continuous running length of fiber comprising continuously moving the fiber through a conduit while simultaneously flowing a solvent for the material through the conduit with the conduit having a length and cross sectional area sufficient to facilitate extraction of the desired amount of the material. The flow is countercurrent to the movement of the fiber.

26 Claims, 6 Drawing Sheets

METHOD TO EXTRACT MATERIAL FROM A RUNNING LENGTH OF FIBER

This application is a division of application Ser. No. 835,020, filed Feb. 28, 1986 now U.S. Pat. No. 4,771,616.

BACKGROUND OF THE INVENTION

This invention relates to an apparatus and method to extract material from a running length of fiber. Particularly, this invention can be used to extract a pre-spinning polymer solvent from a solution spun fiber by solvent to solvent extraction in a conduit by moving a continuous running length of the fiber through the conduit and flowing the extraction solvent through the conduit to remove the pre-spinning polymer solvent from the fiber.

A prior method to extract mineral oil from polyethylene solution spun fiber and a method to manufacture such fiber is disclosed in U.S. Pat. No. 4 413 110 hereby incorporated by reference. A prior art method for treatment of filamentary materials in a tube is found in U.S. Pat. No. 2 509 279.

SUMMARY OF THE INVENTION

This invention is a method of extracting a material from continuous running length of fiber comprising continuously running the fiber through a conduit while simultaneously flowing a solvent for the material through the conduit. The conduit should have a length and cross sectional area sufficient to facilitate extraction of the desired amount of the material, and the direction of the flow of the solvent should be countercurrent to the movement of the fiber. The countercurrent flow of solvent to the movement of yarn occurs so that the concentration of the material being removed from the fiber in the countercurrent flowing solvent changes in a monotonically decreasing manner along the direction of the movement of the fiber, the lowest concentration being at the yarn exit, and the total length of the countercurrent flow in the conduit should be at least about 50 feet in a single unit operation having an infinite number of theoretical stages and the single unit operation should have only one entrance and exit for the fiber and only one entrance and exit for the solvent. The flow of the solvent in the conduit should have an average Reynolds number of at least about 500 when determined with no fiber present in the conduit. It is preferred that the conduit have at least one change of direction. It is also preferred that the residence time of the fiber in the flowing solvent be at least about 20 seconds. It is also preferred that the flow be turbulent, e.g. having an average Reynolds number greater than about 2000. The fiber and the solvent can be heated to facilitate extraction, preferably by heating the fiber prior to contacting the solvent or heating the solvent prior to contacting the fiber. The preferred method is a method where the fiber is a fiber spun from the solution of a polymer and still contains the pre-spinning solvent as the material to be extracted. The polymer for the fiber being spun is preferably selected from the group consisting of polyolefins, their copolymers, polyamides, including aromatic polyamides, their copolymers, acrylics, their copolymers, polyacrylonitrile, polyvinyl alcohol, copolymers of polyvinyl chloride with polyvinyl acetate, or mixtures thereof. The preferred polymer is a polyolefin and more preferably polyethylene. Preferred polyethylene has a number average molecular weight of at least 300,000. The preferred pre-spinning solvent is a hydrocarbon, and the preferred hydrocarbon is decalin, mineral oil, polyethylene wax, or mixtures thereof. The solvent used to remove the pre-spinning solvent, that is, the solvent used for extraction of pre-spinning solvent is preferably selected from the group consisting of hydrocarbons, chlorinated hydrocarbons, and chlorofluorinated hydrocarbons, or mixtures thereof. The preferred chlorofluorinated hydrocarbon is 1,1,2-trichloro 1,2,2-trifluoroethane. The preferred chlorinated hydrocarbon is methylene chloride. Other preferred solvents are Decalin, triethylene glycol, decane, dioxane, perchlorethylene, and trichloroethane.

Typical solvents used to extract polyvinyl alcohol and/or polyacrylonitrile are methanol, water or mixtures thereof. Glycerine is a pre-spinning solvent for polyvinyl alcohol. Dimethyl sulfoxide is a pre-spinning solvent for polyacrylonitrile.

The apparatus for extracting the material from a continuous running length of fiber with the solvent for the material comprises a combination of a conduit having a length and cross sectional area sufficient to facilitate extraction of the desired amount of said material, said length being at least about fifty feet; means to move the continuous running length of yarn through the conduit and means to flow the solvent through the conduit in a flow countercurrent to the movement of the fiber. The counter-current flow takes place in a single unit operation having an infinite number of theoretical stages and having only one entrance and exit for the fiber and only one entrance and exit for the solvent flow so that an average Reynolds number of at least 500, determined with no fiber in the conduit is achieved. It is preferred that the conduit have at least one change in direction.

The preferred means to move the yarn is a set of driven Godet rolls, external to the conduit. The preferred apparatus means to flow the solvent is a pump. The conduit of the apparatus of this invention may run a single direction or it can be bent into a tortuous path. The cross section of the conduit can be a tube of rectangular cross section, circular cross section, elliptical cross section, or other such as semielliptical cross sections. The cross sectional area of the conduit may vary along its length. See the examples. Heat exchange means may be provided to exchange heat with the conduit. The heat exchange means may be a conduit filled with fluid of a different temperature than a conduit containing fiber and surrounding the conduit containing fiber. The conduit could be heated by other means, such as conventional electrical resistance tape. The conduit preferably may change direction anywhere from 90° to 180°. However the preferred conduit change is 180° in the same plane. The apparatus may be a conduit being a parallel series of shorter conduits joined by joining means. The joining means may also be conduit but the preferred joining means is a compartment having a joining inlet and outlet on one side. The compartment can also have internal means of change direction of the fibers such as a pulley. It is preferred that the pulley cylinder have a flat profile, allowing the fiber, when it is multifilament yarn, to spread on the flat surface of the pulley cylinder.

For purposes of this invention, a conduit shall mean any elongated substantially narrow chamber or channel of any shape that permits flow of solvent and movement of fiber therein.

For purposes of this invention, solvent shall mean fluid that is either liquid or vapor and will extract or remove in any manner the desired material from the running length of fiber. The preferred fluid is liquid or a mixture of liquid with vapor, especially the same liquid, vaporized.

By fiber as used herein is meant yarn, thread, filaments, both multifilament and monofilament, and ends of yarn containing multiple filaments, extruded tape, ribbon and the like.

Figure 1:
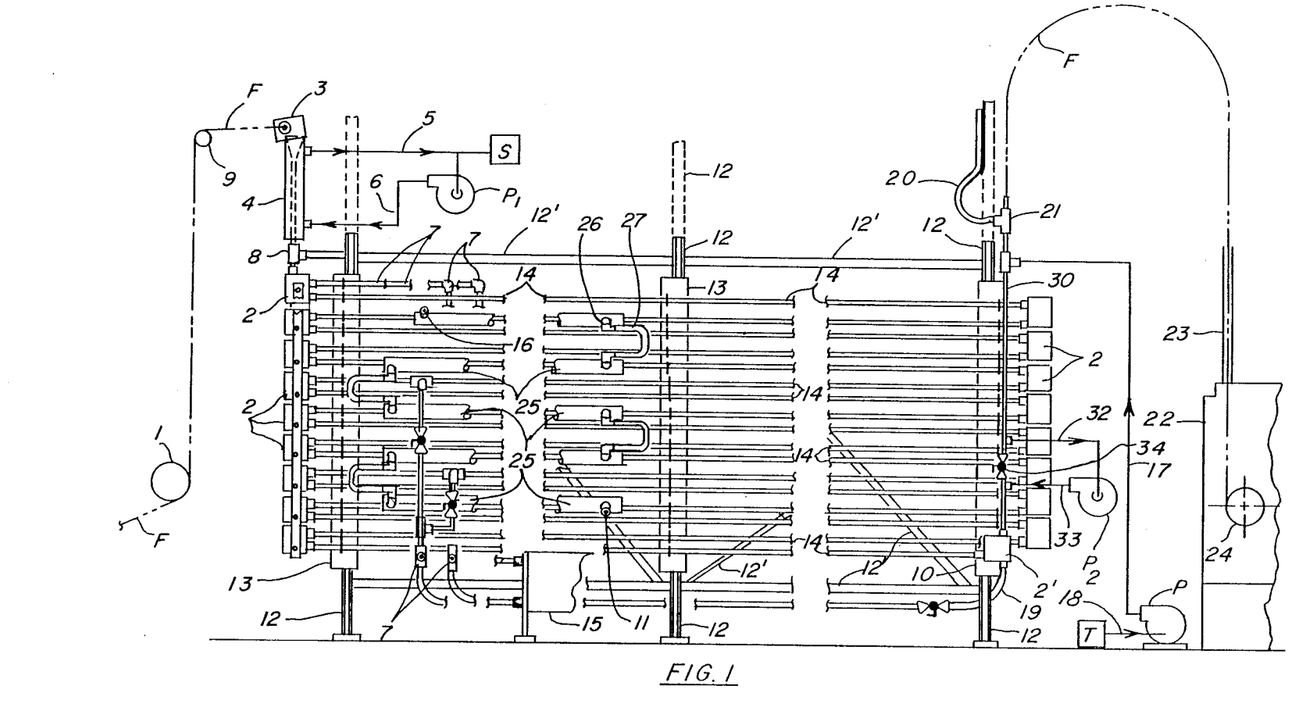
FIG. 1 is a front view of the apparatus of this invention, a tube washer of parallel conduits with joining means.

By unit operation as used herein is meant a single step extraction (or removal in any manner) process having only a single inlet and exit for both fiber and solvent but the unit operation includes the valve and circulation system, when used, to increase pressure of the system near the exit of yarn from the conduit, for example, as shown in FIG. 1, items P2 and 32, 33 and 34.

In FIG. 1, F is the fiber or yarn being extracted by the apparatus of this invention and P and $P_1$ are pumps. Fiber F containing material to be extracted moves from Godet roll 1 across roller guide 9 into entry block 3 of the apparatus of this invention to be processed. Any fugitive solvent vapor can be cooled by condenser 4 surrounding the tube of entry block 3. Cooling fluid is pumped by pump $P_1$ through supply line 6 and returned to pump $P_1$ from return line 5. Makeup is supplied from supply tank S. Fiber moves vertically through pipe tee 8 into first compartment 2. Pipe tee 8 is also connected to a vent, not shown, from sump 15. Fiber F changes direction 90° across a pulley in compartment 2 to move through conduit 14 and across the apparatus to the compartment 2 on the opposite side where the fiber F changes direction 180° to move through the next conduit 14, continuously passing back and forth through conduits 14 and compartments 2 until after passing through the bottom conduit 14 the fiber F enters compartment 2', makes a 90° direction change to move through conduit 30 upward through pipe tee 21 and through a conduit, not shown, into conduit 23 which is the cabinet entrance to cabinet 22 where it is further moved along for further processing across driven Godet roll 24. Yarn exiting the conduit 30 also can be passed over a direction changing device such as a roller or pulley where washing solvent trapped in the yarn is separated from the yarn by centrifugal force and collected. Passage over a pulley can be repeated to collect a large portion of the entrapped fluid. Stand pipe 20 is also connected to pipe tee 21 but does not receive yarn. Liquid in stand pipe 20 will be at the same level as in the connecting conduit, not shown, between pipe tee 21 and conduit 23. The desired solvent used to extract the material from the moving fiber enters conduit 30 through line 17 from pump P which is supplied with fresh solvent through line 18 from tank T. Solvent flows through conduit 30 to compartment 2' and through conduit 14 back and forth through compartments 2 and conduits 14 in countercurrent flow to the movement of fiber. Solvent finally leaves after traversing the conduits 14 through solvent return line 7 to sump 15. An auxiliary pump $P_2$ can be used to increase pressure near the exit of the yarn from conduit 30 removing solvent downstream of ball valve 34 in line 32 and returning solvent at higher pressure in line 33 upstream of partially open valve 34. Operation of this system is described more fully in Example 4. A solvent drain line 19 which is normally closed also exits from compartment 2'. When heat exchange means are used, heat exchange fluid is supplied through line 11 and returned through line 16 after flowing through surrounding conduits 25. The entire apparatus is mounted on mounting frame 12 by mounting frame bracket 13 having U clamps at various positions along conduit 14.

Figure 2:
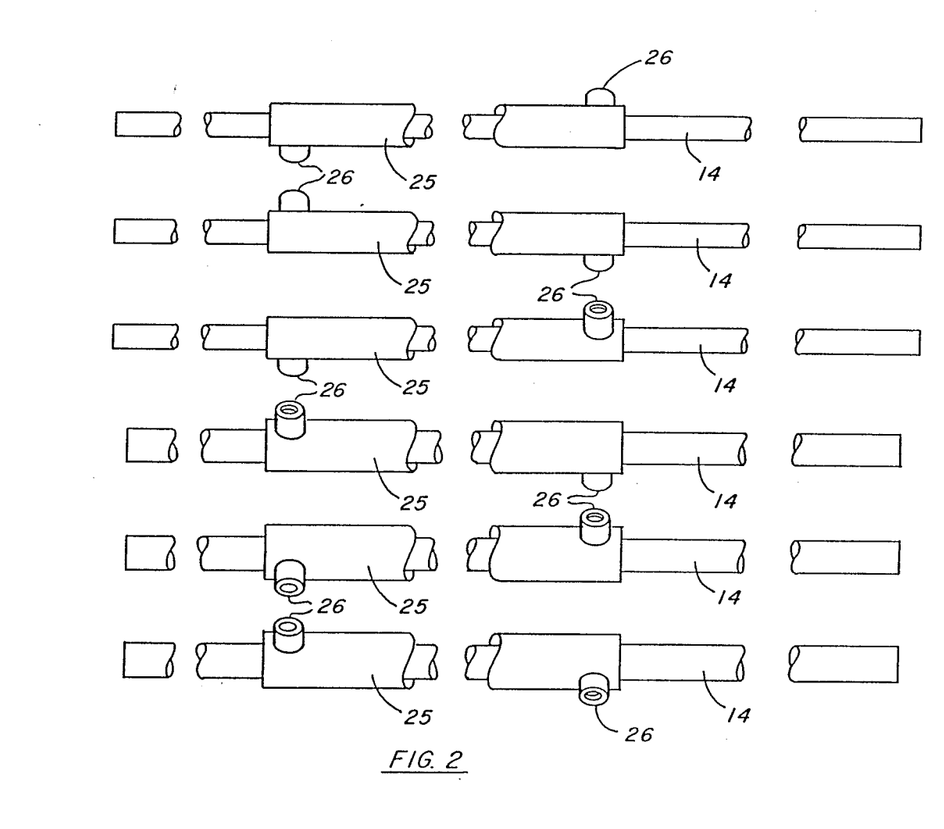
FIG. 2 is a front view of a slightly different embodiment of a tube washer showing a conduit heat exchanger surrounding the conduit of the tube washer.
Figure 3:
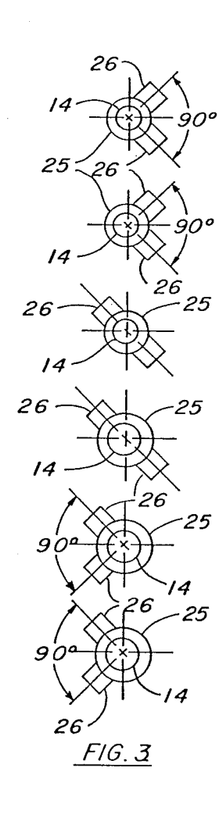
FIG. 3 is an end view of the conduit heat exchanger of FIG. 2.

FIGS. 2 and 3 show in more detail how conduit 14 passes within conduit 25 containing heat exchange fluid so that conduits 14 are heated or cooled by conduits 25. The heat exchange fluid passes between conduits 25 through joining pipes, 27 in FIG. 1, at nipple 26 shown in both figures.

Figure 4:
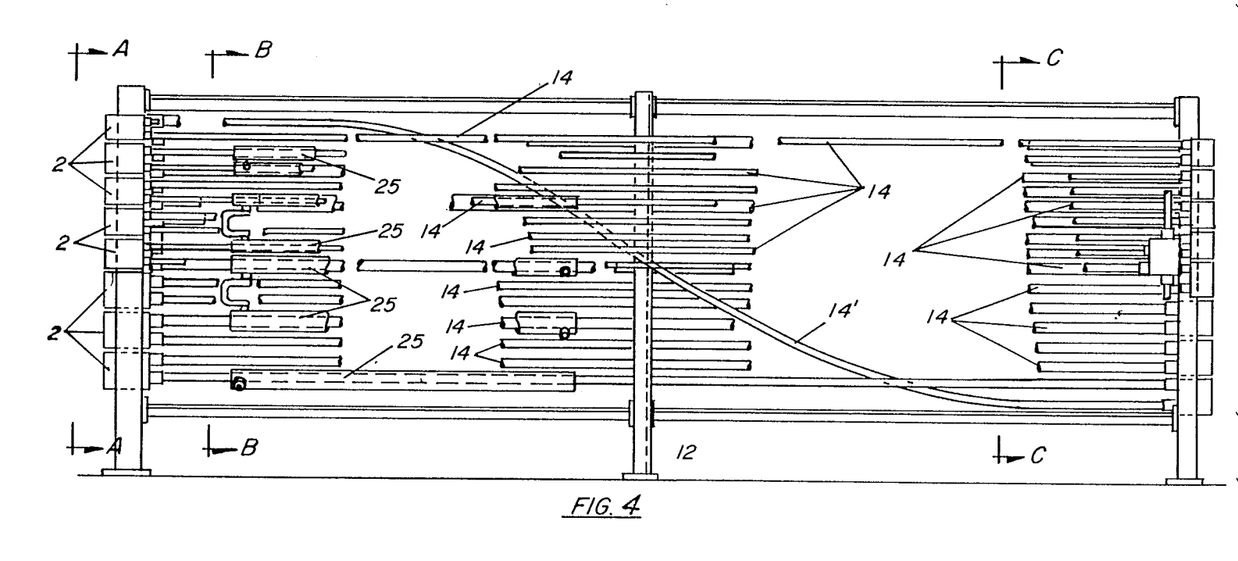
FIG. 4 is a front view of a slightly different embodiment of this invention showing the conduit of the tube washers used in series, one bank of conduits mounted behind the other.
Figure 5:
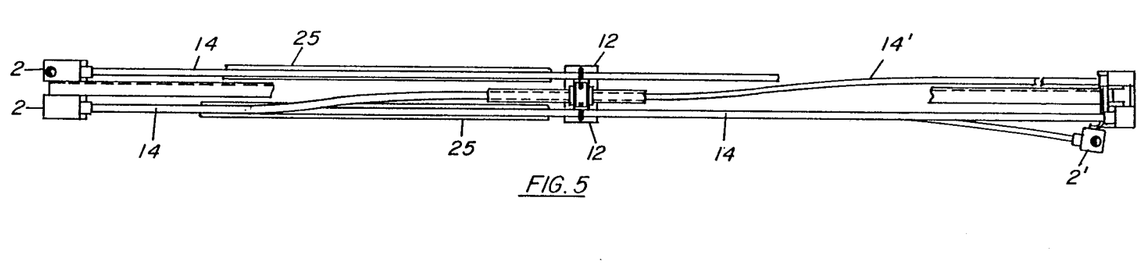
FIG. 5 is a top view of the apparatus of FIG. 4.

In FIGS. 4 and 5 two tube washers comprising conduits 14 are connected in series and yarn and solvent pass through conduits 14 and change directions in compartment 2 as described above for FIG. 1. Also shown is heat conduit 25 and frame 12. A connector conduit 14' connects the two units in series. Conduits 14 are smaller diameter in the rear bank of conduits.

Figure 6:
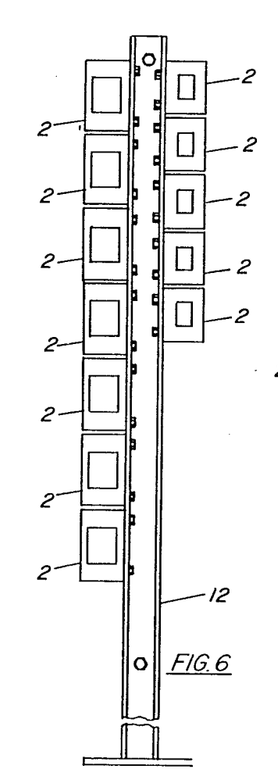
FIG. 6 is a side view of the joining means or compartments of this invention as shown in view A—A of FIG. 4.

FIGS. 6, 7, 8 and 9 describe in more detail the apparatus of FIGS. 4 and 5. FIG. 6 is view A—A in FIG. 4 and shows the end view of compartments 2 mounted on frame 12.

Figure 7:
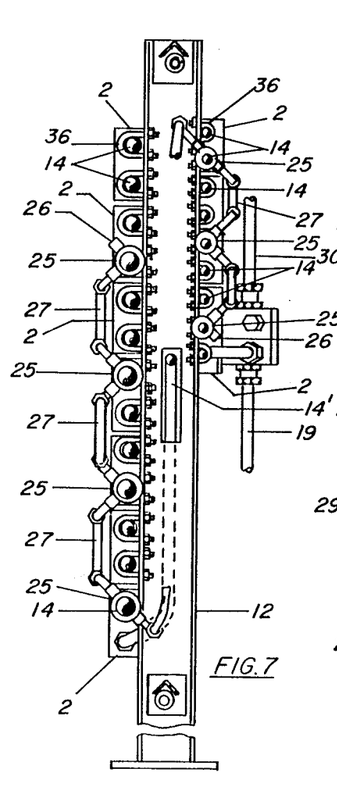
FIG. 7 is a section view from B—B of FIG. 4.

FIG. 7 is a cross section B—B from FIG. 4 showing conduits 14 mounted by U bolts 36 on frame 12 and surrounded by heat exchange conduits 25 connected by connector pipes 27 through nipples 26 while compartment 2' has drain line 19 and conduit 30 extending from the bottom and top thereof.

Figure 8:
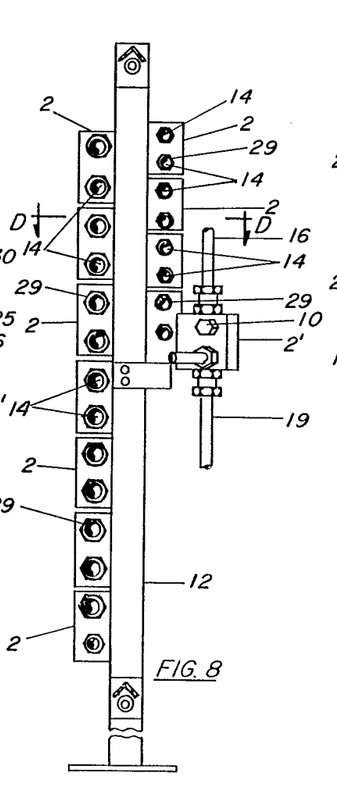
FIG. 8 is a section view from C—C of FIG. 4.

FIG. 8 is cross section C—C from FIG. 4 and shows conduit 14 entering compartment 2 in multiple instances.

Figure 9:
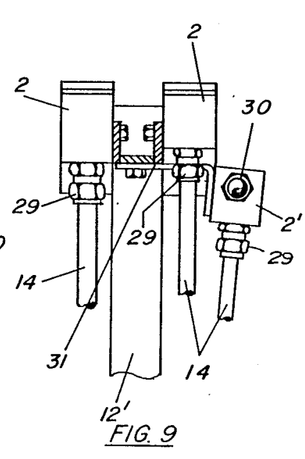
FIG. 9 is a section view from D—D of FIG. 8.
Figure 10:
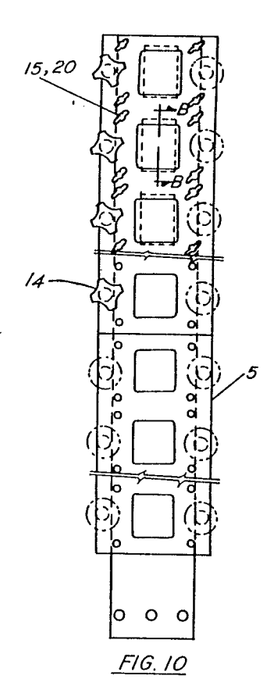
FIG. 10 is a front view of a series of joining means or compartments of this invention, showing a slightly different and preferred embodiment to that shown in FIGS. 1 and 4.
Figure 11:
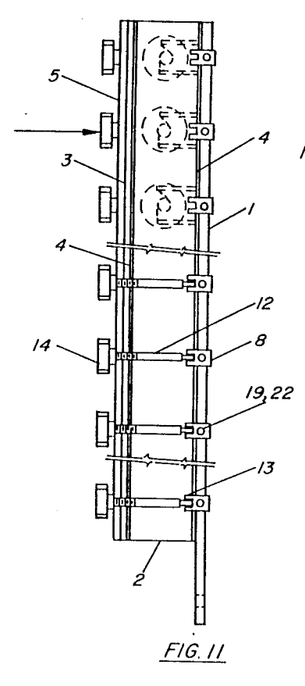
FIG. 11 is a side view of the joining means compartments shown in FIG. 10.
Figures 12, 13:
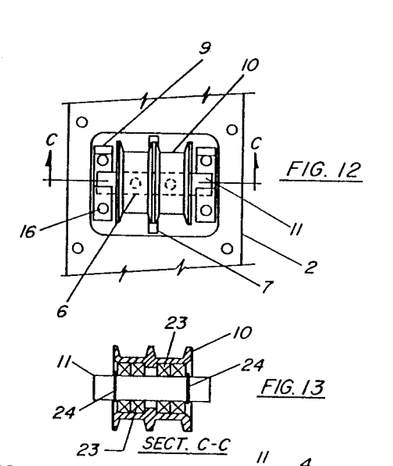
FIG. 12 is a front view of a compartment and pulley shown in FIG. 10.
FIG. 13 is a front view of the pulley of FIG. 12.
Figure 14:
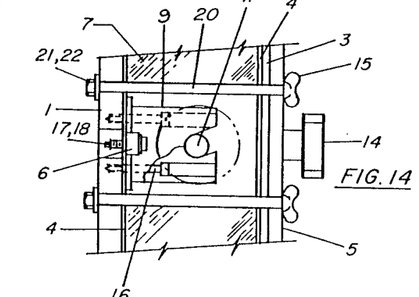
FIG. 14 is a side view of the pulley mounted in the compartment as shown in FIG. 11.

FIG. 9 is section D—D of FIG. 8 showing compartments 2' on mounting bracket 31 having conduits 14 being connected to compartment 2' by coupling 29.

Details of the slightly different, but preferred embodiment of compartments 2 are shown in FIGS. 10, 11, 12, 13 and 14. Compartment 2 has back plate 1, window 3, door gasket 4, door 5, and a pin mount 6 for pin 7. Pin 7 separates two yarn ends entering compartment 2 and passing across each side of pulley 10. Pin mount 6 is held in place by screw and washer 17 and 18. Latch mount 8 secures door 5 by means of adjustable latch rod 12 having knob 14, as shown. Pin 13 connects latch rod 12 to latch mount 8. Pulley 10 is held in position by roller retainer 9 by means of pulley shaft 11 being mounted in notches in retainer 9 as shown. Wing nuts 15 also secure door 5 by means of hold down stud 20 having hexnut 21 and lock washer 22. Retainer 9 is held in place by means of screws 16. Pulley shaft 11 is held in place within pulley 10 by retainer ring 24 and is mounted within ball bearings 23.

Figure 15:
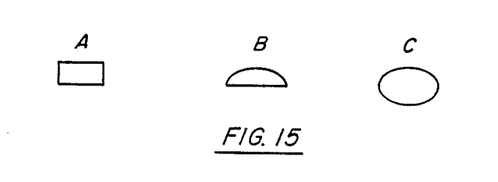
FIG. 15 is a schematic of various conduit cross section shapes.

In FIG. 15 a schematic cross section of the conduit 14 is shown as preferred rectangular section A or semielliptical section B or completely elliptical cross section C.

Figure 16:
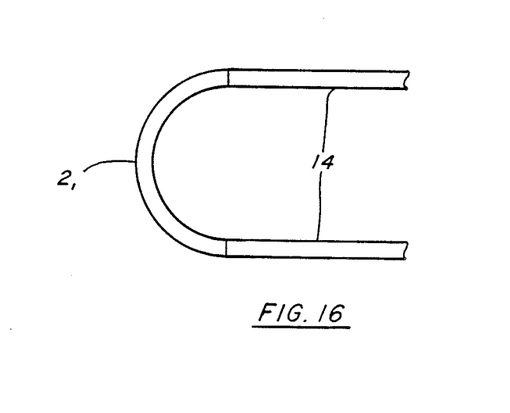
FIG. 16 is a schematic of a joining means conduit.

FIG. 16 is also a schematic showing a conduit joining means $2_1$ which could replace compartment 2 joining conduits 14 in the drawing.

EXAMPLES

The following examples demonstrate the apparatus and method of this invention in use when the polymer is a polyolefin having a molecular weight of about 3 million by the number average method, where the pre-spinning solvent to be extracted as the material from the continuous running length of fiber is mineral oil, when the solvent used to extract the mineral oil is 1,1,2-trichloro 1,2,2-trifluoroethane. Table 1 shows the specific parameters and operating conditions for each examples. The fiber fed to the apparatus was a yarn having 118 filaments and a denier of about 100,000, including the pre-spinning solvent, mineral oil, or about 6,300 not including mineral oil.

Yarn tension should be adequate to transport yarn through the conduit at the desired speed, but should not be so high as to damage or break the yarn. The examples herein had a tension at the yarn exit of the tube washer of about 13,000 grams for about 4,200 denier yarn (denier calculated excluding solvent).

Trace amounts of water from quenching can be carried with the fiber into the tube washer. Such water would be immediately removed from the fiber and carried away with solvent exiting the tube washer.

EXAMPLES 1 & 2

In these examples the conduit or tube washers use multiple passes of tubing that are vertically stacked and horizontally parallel to each other. The description given above for FIG. 1 is followed. The yarn enters the top tube and exits the bottom tube. The solvent enters the bottom tube and exits the top tube in a countercurrent flow pattern. The yarn passes through each tube only once for true continuous countercurrent flow.

The solvent flow in the tubing is turbulent (Reynold's number >2,000 at 20° C.) with no yarn present in the tube. The presence of moving yarn adds to the turbulence. Boiling of the solvent also increases turbulence. Increases in turbulence increase the oil removal rate from the yarn.

At joining means or compartment locations where the yarn changes direction of travel, the yarn is supported by one of three means.

A. The inner surface of a bent tube (FIG. 16).

B. The surface of a nonrotating roll that is enclosed by a chamber or compartment to contain the solvent.

C. The surface of a freely rotating roll that is enclosed by a compartment to contain the solvent. (This is the preferred method if many changes of direction are required.) (Such as in FIGS. 10 to 14).

For Example 1, all tubing was 1 inch O.D. (⅞ inch I.D.). For Example 2, top 15 percent was 1¼ inches O.D. (1⅛ inches I.D.); bottom 10 percent was ¾ inch O.D. (⅝ inch I.D.); with remaining tubing 1 inch O.D. (⅞ inch I.D.).

Single yarn end pulleys with no dividing ridge but otherwise similar to that shown in FIG. 10 to 14 were used in the compartments where yarn changes direction. These pulleys may be driven or free wheeling. In this example the pulleys were freely rotatable. An auxiliary pump can be used to increase pressure in the conduit. See the description in Example 4.

EXAMPLE 3

In this example the conduit or tube washer consisted of one continuous length of 1 inch O.D. (⅞ inch I.D.) tubing. A chamber or compartment was located at each end of the tubing to supply and collect the solvent in the tubing. Rolls were used at the entrance and exit of the tubing to guide the yarn. Two 180° bends (on a 6-inch radius) were present in the tubing to shorten the length of the washer. The tubing remained in a substantially horizontal plane. The unit was appoximately 70 feet long with a total of approximately 160 feet of tubing. The yarn contacted the inner surface of the bent tubing or conduit. No rolls were used internally. The tubing was not heated, however, the solvent was preheated before entering the tube. The solvent flow was countercurrent to the yarn.

EXAMPLE 4

(Preferred Embodiment and Best Mode)

This conduit or tube washer is similar in operation to Examples 1 and 2. However, it is made to handle multiple fiber ends. The tubing or conduit is rectangular. Free wheeling or rotatable rolls with raised edges are used to separate the ends. See FIGS. 10 to 14.

An auxiliary pump can be used to increase pressure near the exit of the yarn from the conduit, by supplying solvent at a point in the conduit (tubing) near the yarn exit and removing solvent at a very short distance further downstream of yarn movement. Between the auxiliary pump flow entrance and exit in the conduit, a flow restricting device such as a modified ball valve would be partially closed on the moving yarn to constrict solvent flow in the conduit and increase upstream pressure in the tube washer. The ball valve is modified by removing a slotted portion of the ball leading to the opening upstream of the yarn movement to permit yarn passage through the slot into the partially opened ball opening. Other means could be used to restrict solvent flow and still allow passage of the fiber as long as fiber is not damaged.

In each case the yarn can be threaded through the conduit by use of a typical electrician's tool ("snake") used to fish wire through conduit or by first pushing a stiff yarn through the conduit length and attaching the yarn to be processed to the end of the stiff yarn, or by aspirating with a suction source at one end of the conduit.

The material of construction may be any metal or plastic or the like which is resistant to the material and solvent being processed. For example, stainless steel or nylon parts may be used with the fiber and solvent of these examples.

BENEFITS OF THE INVENTION

The use of this invention provides an extraction process with an infinite number of theoretical stage process. The concentration of the material being removed from the fiber in the countercurrent flowing solvent changes along the length of the fiber being extracted in a monotonically decreasing manner, the lowest concentration being at the yarn exit. Preferably there is a smooth curve gradient of decreasing concentration along the length of the fiber. This result would be unexpected by one who would initially visualize the conduit as a single stage. An exceptionally effective extraction process is achieved. An enormous amount of material is removed from the fiber by extraction by use of this invention. For example about 93 percent by weight (of yarn including mineral oil) of the yarn entering the tube washer is the pre-spinning solvent which is removed from fiber by the tube washer. The yarn is extracted down to only 1.5 percent by weight of pre-spinning solvent, mineral oil, in the fiber by the system in less than about two minutes, as shown in the examples.

The system is closed to the atmosphere except at the exit and entrance of the yarn where the area exposed is small and can be controlled and vapors collected. This is important where either the solvent or the material being extracted from the yarn is environmentally sensitive or toxic or explosive.

In the preferred embodiment of the examples, the pressure gradient of this system, top to bottom, allows an increase of temperature of the solvent at the bottom of the system to above its atmospheric boiling point and resulting increased temperature thereby improving effectiveness of the solvent extraction. Note in Examples 2 and 4 where the temperature of the solvent at the bottom of the tube washer is 55° C. wherein the atmospheric boiling point is about 47° C. The solvent is allowed to cool to 45° C. before it exits the tube washer so that it does not boil violently on reaching the lower pressure at the top of the tube washer.

TABLE I

| | Example 1 | Example 2 |
|---|---|---|
| Washer Conduit Segment Length, ft | 19.5 | 19.5 |
| Number of Tube Passes | 17 | 19 |
| Yarn Submerged in Solvent, ft (approx) | 340 | 380 |
| Tubing Inside Dimension, in. (diameter) | ⅜ | 1⅛, ⅝, ⅜ |
| Tubing Heated, ft | 30 | None |
| Heating Water Temp., °C. | 43 | — |
| Solvent Temp. at its Inlet, °C. | 40 | 55 |
| Solvent Temp. at its Exit, °C. | 41 | 45 |
| Partial Boiling of Solvent | Yes | Yes |
| Production Rate: | | |
| Polymer, lb/hr | 4.0 | 5.0 |
| Mineral Oil, lb/hr | 63 | 72 |
| Solvent Flow Rate, gpm | 1.0 | 0.95 |
| Solvent Flow Rate, lb/hr | 800 | 760 |
| Reynolds No. of Solvent Flow, (Re = ud ρ/μ)** | 8,300 | 6,000 7,800 11,000 |
| Oil-In-Solvent: | | |
| Solvent Inlet, wt %*** | <0.05 | <0.05 |
| Solvent Outlet, wt % (approx.) | 7.3 | 8.7 |
| Oil-In-Yarn: | | |
| Yarn Inlet, wt % | 94 | 93.5 |

TABLE I-continued

| | | |
|---|---|---|
| Yarn Outlet, wt % | <1.5 | <1.5 |
| Percent of Solvent Flow Provided By: | | |
| Gravity | 100 | 60 |
| Centrifugal Pump | — | 40 |
| Yarn Speed: | | |
| Inlet, m/min | 47 | 55 |
| Outlet, m/min | 69 | 70 |
| Draw Ratio, (In Washer) | 1.5 | 1.3 |
| Pressure psig (approx) low pt in washer | 7 | 9 |

| | Example 3 | Example 4 |
|---|---|---|
| Washer Conduit Segment Length, ft | 160 | 19 |
| No. of Tube Passes | 1**** | 27 |
| Yarn Submerged in Solvent, ft (approx) | 160 | 520 |
| Tubing Inside Dimension, in. (diameter) | ⅜ | ¾ × 1¾ Rectangular |
| Tubing Heated, ft | None | None |
| Heating Water Temp., °C. | — | — |
| Solvent Temp. at its Inlet, °C. | 40 | 55* |
| Solvent Temp. at its Exit, °C. | 30 | 45* |
| Partial Boiling of Solvent | No | Yes* |
| Production Rate: | | |
| Polymer, lb/hr | 3.5 | 8.0* |
| Mineral Oil, lb/hr | 55 | 126* |
| Solvent Flow Rate, gpm | 0.4–0.6 | 2.0* |
| Solvent Flow Rate, lb/hr | 320–480 | 1,600* |
| Reynolds No. of Solvent Flow, (Re = ud ρ/μ)** | — | 8,000* |
| Oil-In-Solvent: | | |
| Solvent Inlet, wt %*** | <0.05 | <0.05* |
| Solvent Outlet, wt % (approx) | 10 | 7.3* |
| Oil-In-Yarn: | | |
| Yarn Inlet, wt % | — | 94* |
| Yarn Outlet, wt % | 20–30 | <1.5* |
| Percent of Solvent Flow Provided By: | | |
| Gravity | 100 | 60* |
| Centrifugal Pump | — | 40* |
| Yarn Speed: | | |
| Inlet, m/min | 40 | 47* |
| Outlet, m/min | 60 | 69* |
| Draw Ratio, (In Washer) | 1.5 | 1.3* |
| Pressure psig (approx) low pt in washer | — | 8* |

*Estimated
**No Yarn Present (empty tube) at 20° C.
***Wt Oil/Wt Oil + Wt Solvent × 100 = Wt %
****With Two 180° Turns

What is claimed is:

1. The method of extracting a material from a continuous running length of fiber comprising
    a) continuously moving said fiber through a conduit while, simultaneously
    b) flowing a solvent for said material through said conduit, said conduit having a length and cross sectional area sufficient to facilitate extraction of the desired amount of said material and said flow in step b) is countercurrent to said movement of said fiber in step a), so that the concentration of the material being removed from the fiber in the countercurrent flowing solvent changes in a monotonically decreasing manner along the direction of movement of the fiber, the lowest concentration being at the yarn exit and the total length of countercurrent flow in said conduit being at least about fifty feet in a single unit operation having an infinite number of theoretical stages and said single unit operation having only one entrance and exit for said fiber and only one entrance and exit for said solvent, and said flow of said solvent in said conduit having an average Reynolds number of at least about 500 when determined with no fiber present in said conduit.

2. The method of claim 1 wherein there is at least one change of direction in said conduit.

3. The method of claim 1 wherein the residence time of said fiber in said flowing solvent is at least about 20 seconds.

4. The method of claim 1 wherein the average Reynolds number is greater than about 2,000.

5. The method of claim 1 wherein said fiber and solvent are heated.

6. The method of claim 1 wherein said fiber is heated prior to contacting said solvent.

7. The method of claim 1 wherein said solvent is heated prior to contacting said fiber.

8. The method of claim 1 wherein the fiber is multifilament fiber spread into a flat profile.

9. The method of extracting the solvent from a continuous running length of fiber spun from a solution of a polymer containing pre-spinning solvent comprising
 (a) continuously moving said fiber through a conduit while, simultaneously
 (b) flowing an extraction solvent for said pre-spinning solvent through said conduit, said conduit having a length and cross sectional area sufficient to facilitate extraction of the desired amount of said pre-spinning solvent and said flow in step b) is countercurrent to said movement of said fiber in step a), so that the concentration of the pre-spinning solvent being removed from the fiber in the countercurrent flowing extraction solvent changes in a monotonically decreasing manner along the direction of movement of the fiber, the lowest concentration being at the yarn exit and the total length of countercurrent flow in said conduit being at least about fifty feet in a single unit operation having an infinite number of theoretical stages and said single unit operation having only one entrance and exit for said fiber and only one entrance and exit for said extraction solvent, and said flow of said extraction solvent in said conduit having an average Reynolds number of at least about 500 when determined with no fiber present in said conduit.

10. The method of claim 9 wherein said polymer is selected from the group consisting of polyolefins, their copolymers, polyamides, their copolymers, acrylics, their copolymers, polyacrylonitrile, polyvinyl alcohol, copolymers of polyvinylchloride with polyvinyl acetate, and mixtures thereof.

11. The method of claim 10 wherein the polymer is a polyolefin.

12. The method of claim 11 wherein the polyolefin is polyethylene.

13. The method of claim 12 wherein the polyethylene has a number average molecular weight of at least about 300,000.

14. The method of claim 13 wherein said pre-spinning solvent is a hydrocarbon.

15. The method of claim 14 wherein the solvent is decalin.

16. The method of claim 14 wherein the solvent is mineral oil.

17. The method of claim 14 wherein the solvent is polyethylene wax.

18. The method of claim 13 wherein said solvent used for step b) is selected for the group consisting of hydrocarbons, chlorinated hydrocarbons and chlorofluorinated hydrocarbons, and mixtures thereof.

19. The method of claim 18 wherein said solvent used for step b) is 1,1,2-trichloro 1,2,2-trifluoroethane.

20. The method of claim 18 wherein said solvent used for step b) is methylene chloride.

21. The method of claim 18 wherein said solvent used for step b) is dioxane.

22. The method of claim 18 wherein said solvent used for step b) is decalin.

23. The method of claim 18 wherein said solvent used for step b) is triethylene glycol.

24. The method of claim 18 wherein said solvent used for step b) is decane.

25. The method of claim 18 wherein said solvent used for step b) is perchloroethylene.

26. The method of claim 18 wherein said solvent used for step b) is trichloroethane.

* * * * *